United States Patent [19]
Lim

[11] Patent Number: 6,018,375
[45] Date of Patent: Jan. 25, 2000

[54] CATHODE RAY TUBE HOLDING DEVICE

[75] Inventor: Seon-Wo Lim, Suwon, Rep. of Korea

[73] Assignee: SamSung Electronics Co., Ltd., Kyungki-do, Rep. of Korea

[21] Appl. No.: 09/050,115

[22] Filed: Mar. 30, 1998

[30] Foreign Application Priority Data

Mar. 28, 1997 [KR] Rep. of Korea ............... 97-11043

[51] Int. Cl.[7] ............................................. H04H 5/64
[52] U.S. Cl. ........................ 348/829; 348/836; 361/682
[58] Field of Search ........................... 312/712; 348/836, 348/829, 843, 825; 361/681, 682, 683, 825, 829; 313/447, 408, 462, 477

[56] References Cited

U.S. PATENT DOCUMENTS

| | | | |
|---|---|---|---|
| 5,410,373 | 4/1995 | Sagues et al. ............... | 348/836 |
| 5,673,982 | 10/1997 | Chase et al. ............... | 361/681 |
| 5,682,300 | 10/1997 | Sung ........................... | 312/7.2 |
| 5,844,635 | 12/1998 | Kim ............................ | 348/826 |

*Primary Examiner*—Peter M. Cuomo
*Assistant Examiner*—Gerald A. Anderson
*Attorney, Agent, or Firm*—Robert E. Bushnell, Esq.

[57] ABSTRACT

A monitor using holders for a cathode ray tube is provided. The monitor may be constructed using a pair of holders for the cathode ray tube, a front cover, and a rear cover. The upper and lower holders are designed to hold the upper and lower edges of the cathode ray tube. Each of the holders has flanges along opposite edges that form front and rear flanges that are positioned abutting the front and rear covers, respectively. A main fastener hole is positioned on each end of the front flange to allow the mounting ears of the cathode ray tube to be fastened to a main boss of the front cover. Each of the holders has a plurality of fastener holes that allow each of the holders to be fastened to support bosses positioned around the main boss on the front cover. A rubber washer is interposed between each mounting ear of the cathode ray tube and the corresponding fastener hole. Each end of the flange is partially depressed at a position near the main fastener hole to accommodate the rubber washer. Alternatively, as a second embodiment, the upper and lower holders can be manufactured along with two side members as a unitary piece.

21 Claims, 5 Drawing Sheets

CATHODE RAY TUBE HOLDING DEVICE

CLAIM OF PRIORITY

This application makes reference to, incorporates the same herein, and claims all rights accruing thereto under 35 U.S.C. §119 through my patent application entitled *Cathode Ray Tube Holding Device and Monitor with such a Device* earlier filed in the Korean Industrial Property Office on the 28th day of March 1997 and there duly assigned Serial No. 1997/11043.

BACKGROUND OF THE INVENTION

1. Field of the Invention

The present invention relates to a monitor and, more specifically, to a CRT holding device capable of effectively holding a large cathode ray tube in an injection molded housing.

2. Background Art

A monitor chassis is generally constructed using a stand, a front housing, and a rear housing. The housings contain a cathode ray tube and a printed circuit board. The increasing performance demands for display devices, resulting from widespread use of multi-media applications, has led to the development of various techniques to increase the overall quality of display devices. One method of enhancing monitor performance has been to supplement the main printed circuit board with additional side mounted printed circuit boards. A second method of enhancing the quality of the viewed images is to generate a larger video image. This is done by increasing the size of the cathode ray tube. The increase in size of the typical cathode ray tube has resulted in monitors becoming bulkier and heavier.

Research targeted at improving the assembly and design of monitors is shown, by way of example, in: U.S. Pat. No. 4,459,640 to Latasiewicz entitled *Display Mounting Assembly*, U.S. Pat. No. 4,245,274 to Mac Donald entitled *Readout and Circuit Board with Test Access*, U.S. Pat. No. 5,122,928 to Lo entitled *Monitor Housing*, U.S. Pat. No. 5,575,545 to Wang entitled *Monitor Shell*, U.S. Pat. No. 5,419,629, to Korinsky entitled *Electronics Chassis and Method of Manufacture Therefor*, U.S. Pat. No. 5,045,974 to Ohkoshi entitled *Display Tube Assembly and Mounting Process Thereof*, and U.S. Pat. No. 5,515,240 to Rodeffer entitled *Self-Locking Housing Including Tabs that Bear Against the Sides of the Printed Circuit Board*. Contemporary monitors have increased stress on the fastener connections used to assemble the monitors. This increased stress is due to the weight of the larger sized cathode ray tubes.

I believe that it may be possible to improve on the contemporary art by providing a monitor that distributes force normally exerted on the fastener connections onto both the chassis and the base of the monitor, that increases the lifespan of the monitor, that increases the market competitiveness of monitors, that does not require reinforcing ribs to be mounted along fastener connections to prevent failure, that can be manufactured using a typical injection molding process rather than the more costly gas injection molding process, and that can be produced using a less plastic that has a lower wear resistance.

SUMMARY OF THE INVENTION

Accordingly, it is an object of the present invention to provide an improved monitor that uses a cathode ray tube support device.

It is another object to provide a monitor that distributes force normally exerted on the fastener connections onto both the chassis and the base of the monitor.

It is still another object to provide a monitor that has an increased lifespan.

It is yet another object to provide a monitor that has increased market competitiveness.

It is still yet another object to provide a monitor that can be manufactured using plastic with a lower wear resistance to form the chassis.

It is a further object to provide a monitor that can be manufactured without using reinforcing ribs to protect the fastener connections from failure.

It is a further object still to provide a monitor that can be formed by a typical injection molding process rather than the more costly gas injection molding process.

To achieve these and other objects, a monitor using holders for a cathode ray tube is provided. The monitor may be constructed using a pair of holders for the cathode ray tube, a front cover, and a rear cover. The upper and lower holders are designed to hold the upper and lower edges of the cathode ray tube. Each of the holders has flanges along opposite edges that form front and rear flanges that are positioned abutting the front and rear covers, respectively. A main fastener hole is positioned on each end of the front flange to allow the mounting ears of the cathode ray tube to be fastened to a main boss of the front cover. Each of the holders has a plurality of fastener holes that allow each of the holders to be fastened to support bosses positioned around the main boss on the front cover. A rubber washer is interposed between each mounting ear of the cathode ray tube and the corresponding fastener hole. Each end of the flange is partially depressed at a position near the main fastener hole to accommodate the rubber washer.

Alternatively, as a second embodiment, the upper and lower holders can be manufactured along with two side members. Thus, the upper and lower holders and the two side members can be produced as an integral whole.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
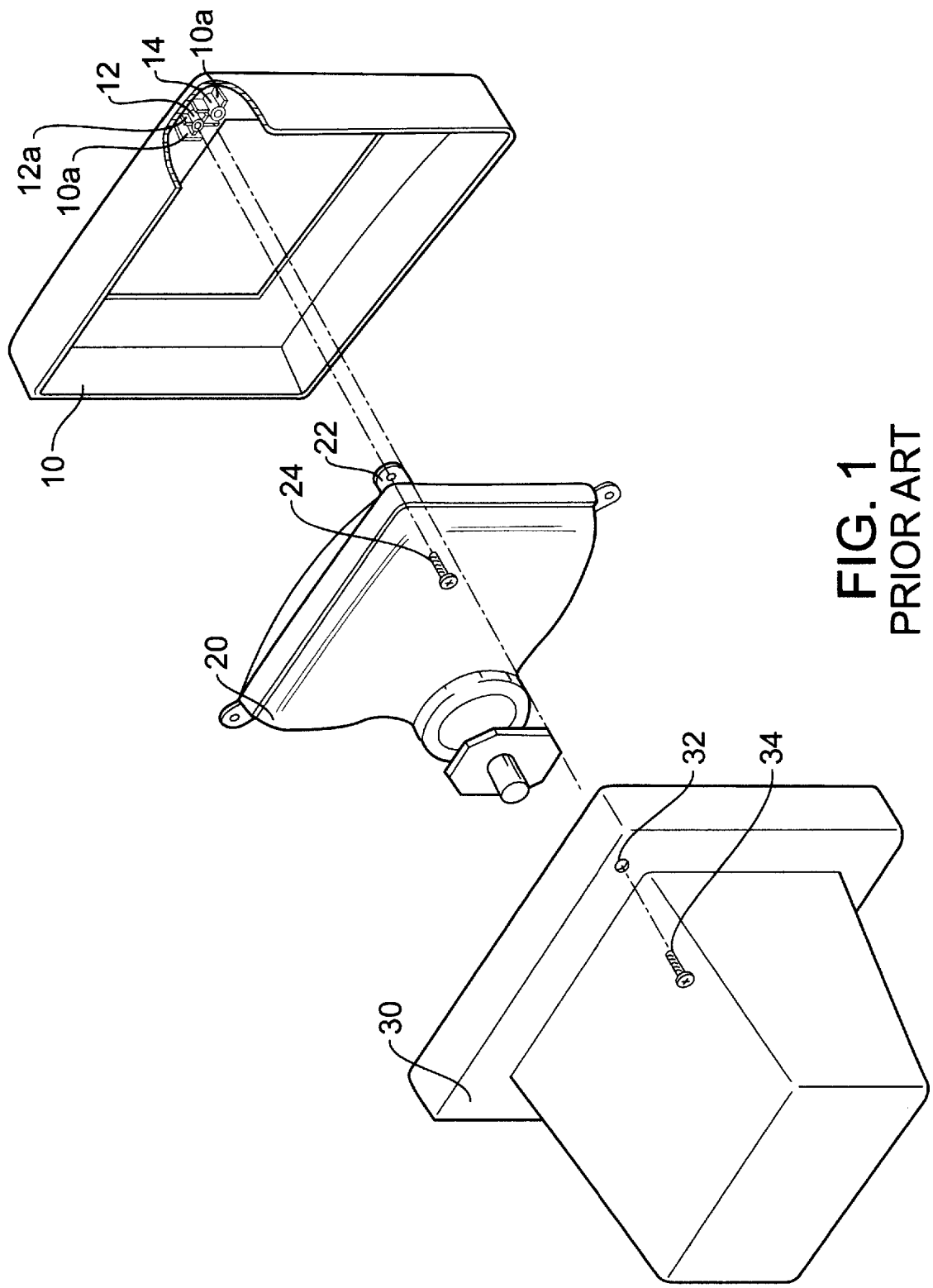
FIG. 1 is an exploded perspective view of a monitor.

Turning now to the drawings, FIG. 1 illustrates a monitor constructed using injection-molded front cover 10 that has a main boss 12 in each corner. Cathode ray tube 20 is attached to front cover 10 via multiple mounting ears that are fastened to main bosses 12. Injection-molded rear cover 30 encloses the cathode ray tube and attaches to front cover 10. Rear cover 30 is fastened to front cover 10 using fasteners 34. To attach rear cover 30 to front cover 10, front cover 10 has second boss 14 positioned near main boss 12. The heavy cathode ray tube 20 is supported by injection-molded front cover 10 so that front cover 10 requires a reinforcing structure to prevent the bosses from failing under stress resulting from the weight of cathode ray tube 20. Multiple first and second ribs 12a and 10a are radially formed on each of main bosses 12 and each second boss 14. These ribs are integrated with the chassis to transfer some of the stress away from the fastener connections. Thus, first and second ribs 12a and 10a aid in preventing the failure of the fastener connections.

Figure 2:
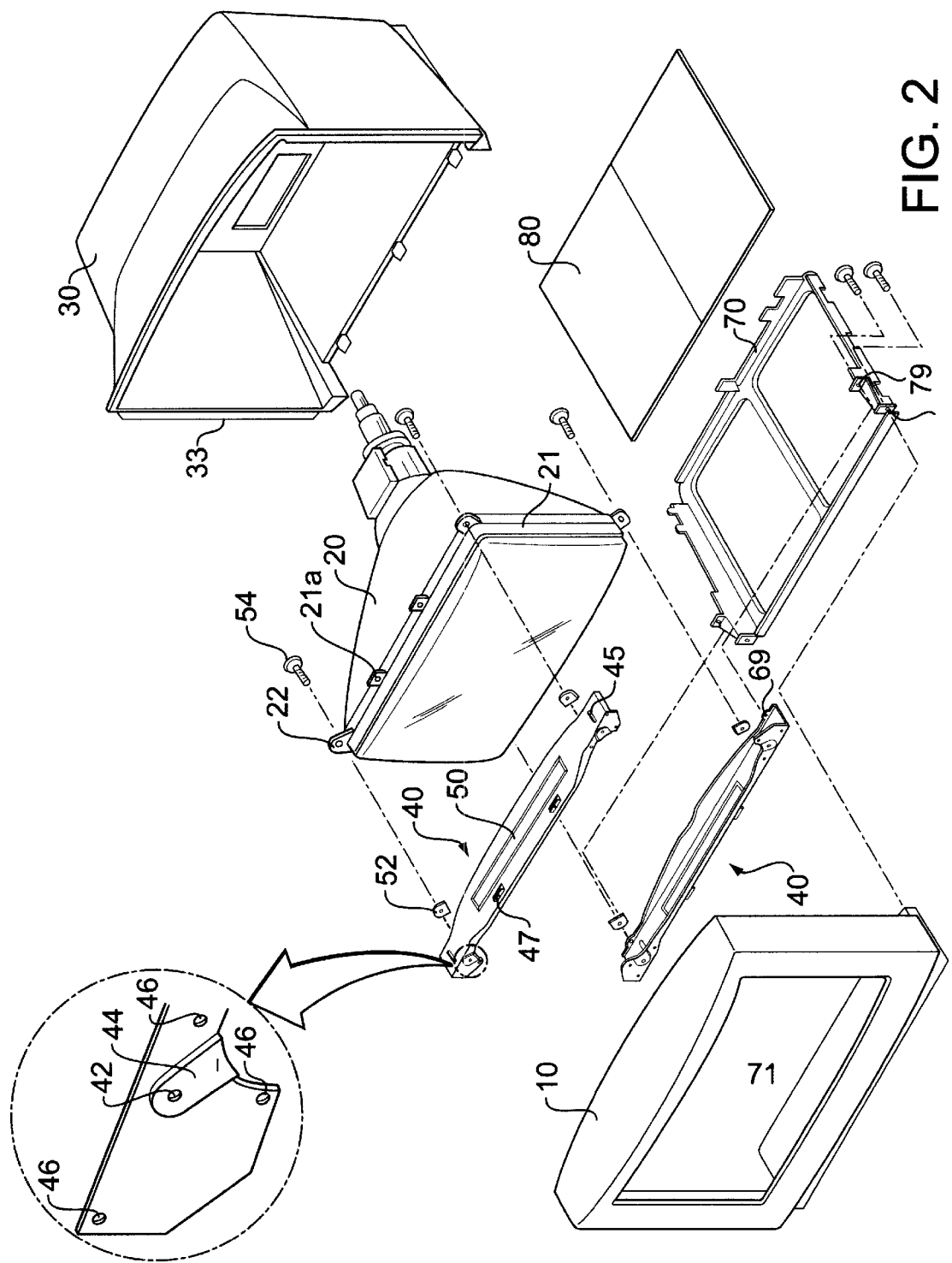
FIG. 2 is an exploded perspective view of a monitor as constructed according to the principles of the present invention showing an upper holder and a lower holder for a cathode ray tube.

FIG. 2 illustrates a monitor as constructed according to the principles of the present invention. Instead of using ribs to reinforce fastener connections and prevent failure, an upper holder and a lower holder are used to secure the monitor and transmit some of the stress away from the fastener connections. Cathode ray tube 20 is mounted to front cover 10 via the upper and lower holders of this invention. The cathode ray tube holders secure the top and bottom edges of cathode ray tube 20. Then, rear cover 30 is attached over the cathode ray tube to the holders.

Figure 3:
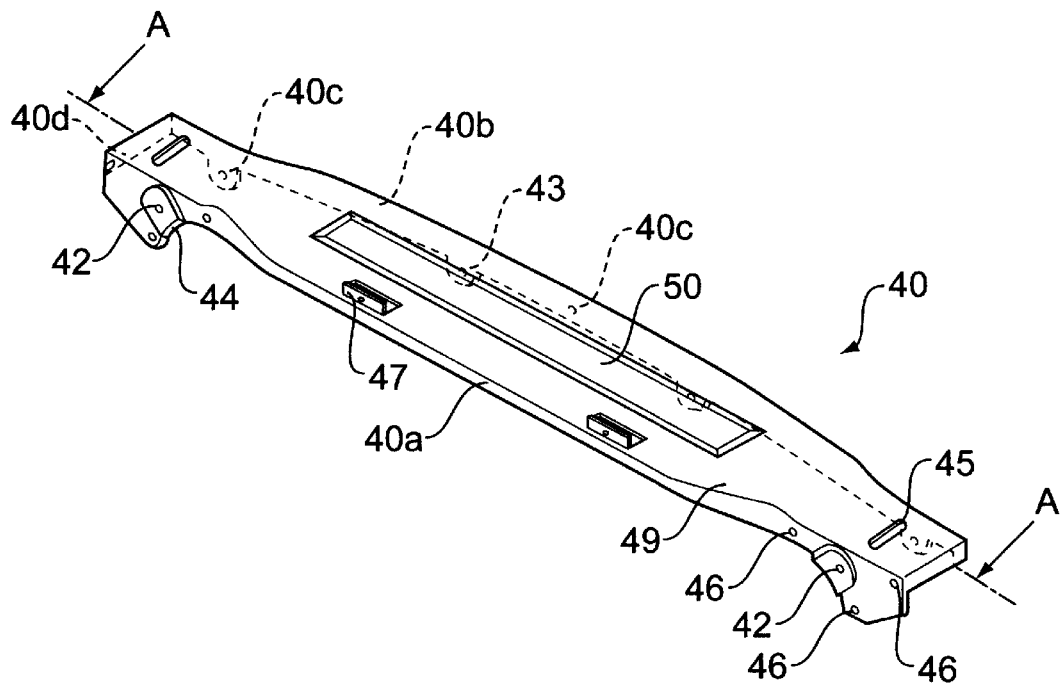
FIG. 3 is a perspective view of the upper holder of FIG. 2 that is attachable to the upper edge of a cathode ray tube.
Figure 4:
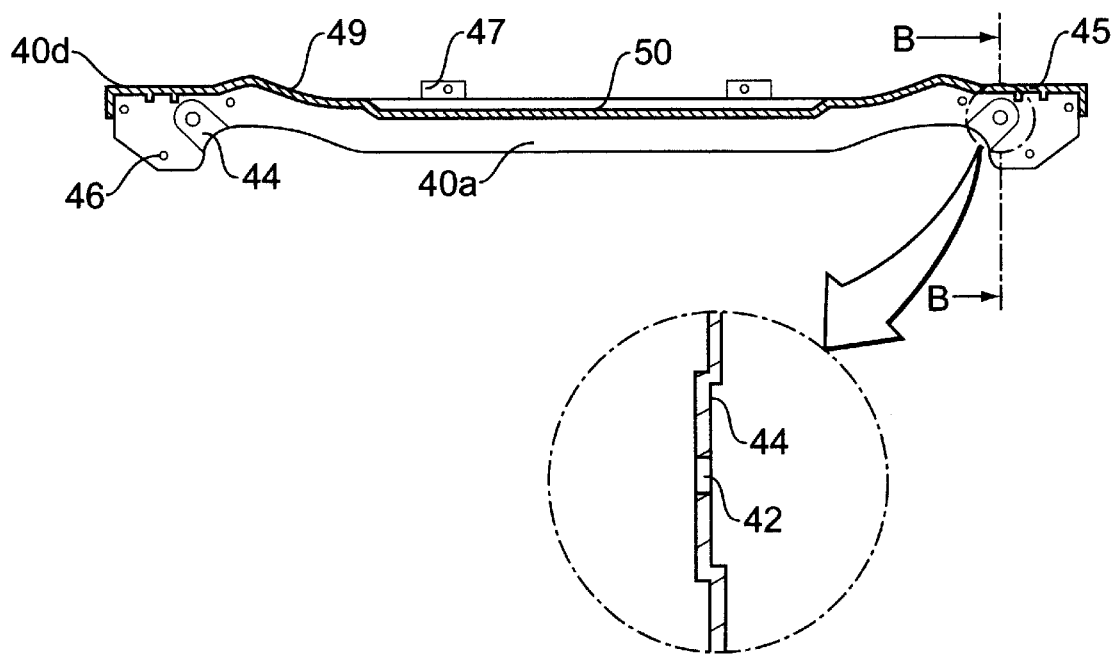
FIG. 4 is a cross-sectional view of the upper holder taken along the line A—A' of FIG. 3.
Figure 5:
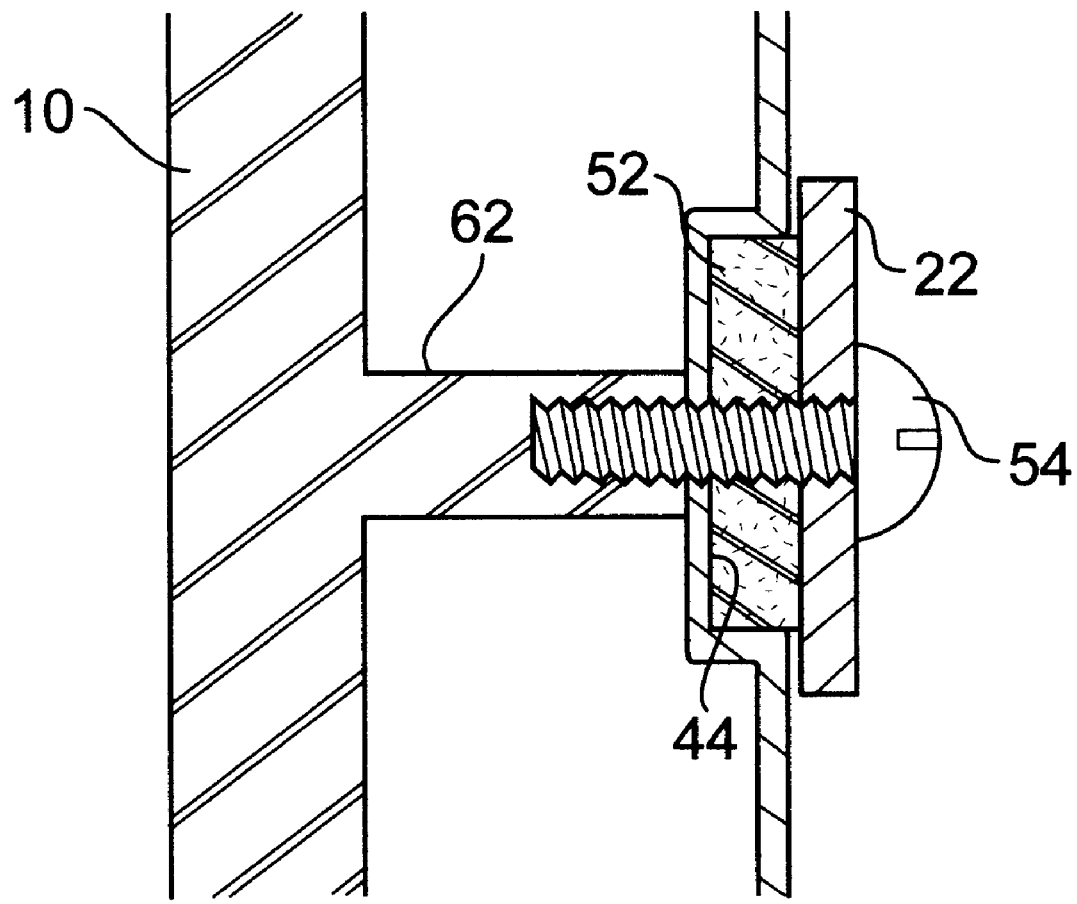
FIG. 5 is a cross-sectional view of the a cathode ray tube mounting ear engaged with a holder of FIG. 2.

As shown in FIGS. 3 and 4, upper holder 40 has a longitudinal channel-shaped configuration, with front and rear flanges 40a and 40b extending downward from opposite edges of holder 40. Each end of front flange 40a has a fastener hole 42 and has a depression positioned around main hole 42. This forms seating surface 44 for a washer to be recessed into. Multiple fastener holes 46 are formed on each end of front flange 40a at positions around seating surface 44. Each end of rear flange 40b also has multiple fastener holes 40c to secure rear cover 30 to holder 40. The lower edge of the rear flange 40b has multiple rounded protrusions along a center portion. Each of the rounded protrusions has a hole 43. This allows the holder to be fastened to band 21 of the cathode ray tube. Band 21 surrounds the outside edge of cathode ray tube 20. Each end of upper holder 40 has side flange 40d. The top plate of cathode ray tube holder 40 is bowed along its center portion to form rectangular reinforcing depression 50 that is suitable for increasing the strength of holder 40. The top plate of holder 40 also has a flanged reinforcing hole 45 at each end. The flange of each hole 45 extends downward from the edge of hole 45 to reinforce hole 45. Located on the front edge of the top plate of holder 40 are two holed protrusions 47. Protrusions 47 are use to securely attach holder 40 to front cover 10. The center portion of the holder 40's top plate including rectangular reinforcing depression 50 is also downwardly bowed, with curve 49 being formed. This depression makes it easier for the holder to attach to the front cover. The ear a of cathode ray tube engaged with a holder is shown in FIG. 5. Rubber washer 52 is seated in seating surface 44 that is formed around main fastener hole 42.

Figure 6:
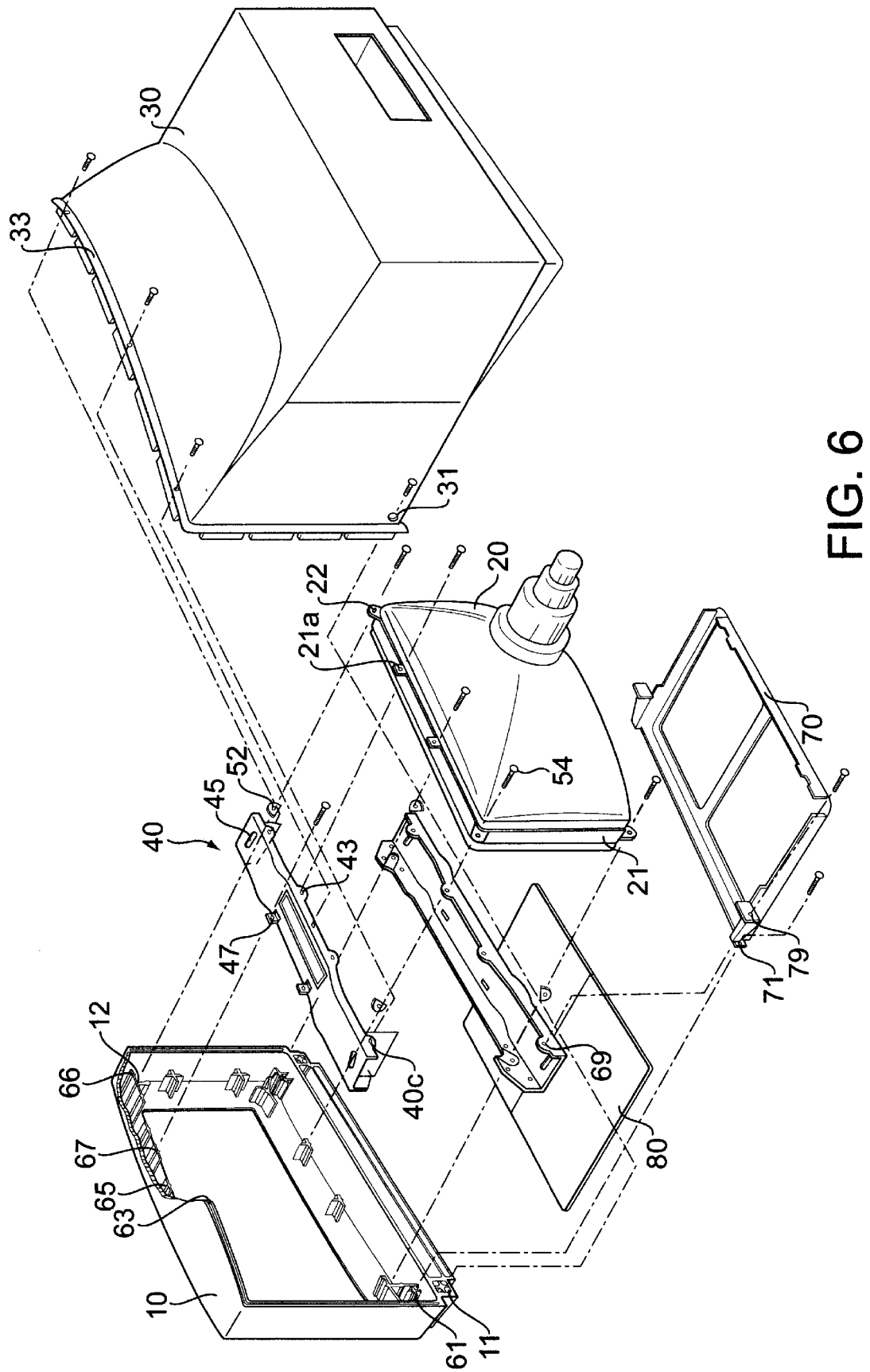
FIG. 6 is an exploded rear perspective view of the monitor of FIG. 2*a*.

The assembly of a monitor as constructed according to the present invention is illustrated in FIGS. 2 and 6. Ears 22 of band 21 of the cathode ray tube are fastened to main bosses 12 of front cover 10. Support fastener holes 46 of each holder 40 engage with reinforcing bosses 66 of front cover 10 using a plurality of fasteners. Reinforcing bosses 66 are integrated with main bosses 12 via multiple boss ribs 61. Each holder 40 has three support fastener holes 46 positioned at each end so that holes 46 form a three-point support structure suitable for rigidly holding cathode ray tube 20. To rigidly mount the top center of the holder 40 to front cover 10, the two holed protrusions 47 of holder 40 are tightly fastened to bosses 67 of front cover 10. In addition, auxiliary holders 21a of cathode ray tube 20's band 21 are fastened to holes 43 of holder 40. The bowed center portion of the top plate of holder 40 supports the lower end of each support rib 65 that is formed on the interior surface of the front cover's top side.

Lower holder is positioned along the lower edge of cathode ray tube 20. The general shape of the lower holder is the same as that of the upper holder, but a chassis mounting hole 69 is formed at each end of lower holder 40. Chassis mounting hole 69 of lower holder 40 is connected to a first fastener hole 79 of a printed circuit board carrying chassis 70, also referred to as frame 70. Frame 70 also has second fastener hole 71, through which chassis 70 is fastened to boss 61 of front cover 10.

Rear cover 30 has multiple fastener holes 31, these allow the rear cover to be fastened to bosses 11 of front cover 10. Rear cover 30 also has multiple fitting projections 33 on its front edge. Fitting projections 33 engage with slots 63 that are formed on the rear edge of front cover 10. Cathode ray tube 20 is mounted to the upper and lower holders 40 with front and rear covers 10 and 30 being connected to holders 40 so that the holders safely and stably hold the heavy cathode ray tube.

When mounting ears 22 of cathode ray tube 20 are mounted to holders 40, rubber washer 52 is positioned on seating surface 44 that is formed around each main fastener hole 42 of holders 40. Rubber washers 52 effectively prevent fasteners 54 from being unexpectedly loosened due to the weight and vibrations of the cathode ray tube 20. Each holder 40 has front, rear and side flanges 40a, 40b and 40c that reinforce the holder. Additionally, rectangular reinforcing depression 50 and flanged reinforcing hole 45 are formed on the top plate of each holder 40. This increases the twisting strength of holder 40.

As described above, the present invention provides a cathode ray tube holding device for monitors. The CRT holding device allows a heavy cathode ray tube to be effectively held within the front and rear covers of a monitor chassis that is produced through a typical injection molding process, rather than a gas injection molding process. The gas injection molding process tends to cause discoloring or leave gas flow marks that require that the monitors have a coating applied after they have been formed. The costly coating step is eliminated by using the holders of the current invention. Additionally, the holding device of the present invention aids in preventing the bosses and ribs of the front and rear covers from shrinking and becoming wrinkled. Furthermore, the mounting ears of a cathode ray tube that are mounted to the holder with an interposed rubber washer seated in a seating surface formed around each fastening portion of the holder. The rubber washer effectively prevents a screw from being unexpectedly loosened due to the weight and vibrations of the CRT.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A monitor, comprising:
    a chassis having a front cover and a rear cover and enclosing a cathode ray tube, said rear cover having a bottom side, said cathode ray tube having a substantially rectangular band positioned around a screen, said band having a bottom edge, two side edges, and a top edge;

a frame having a substantially a rectangular shape, being supported by said bottom side of said rear cover, and being enclosed in said chassis;

a first beam being attached to said lower edge of said band of said cathode ray tube, said first beam engaging said band of said cathode ray tube, said front cover, and said frame, said first beam including a bottom plate supporting a first side plate and a second side plate, said first side plate having a first plurality of flanges being attachable to said frame and said bottom edge of said band of said cathode ray tube, and said second side plate being connected to said front cover;

a second beam being attached to said top edge of said band of said cathode ray tube, said second beam engaging said band of said cathode ray tube, said front cover, and said rear cover, said second beam including a top plate supporting a third side plate and a fourth side plate, said top plate having a bowed center portion, said third side plate having a second plurality of flanges being attachable to said rear cover and to said top edge of said band of said cathode ray tube, and said fourth side plate having a second plurality of flanges being engageable with said front cover, and said first beam and said second beam distributing the force being exerted on a plurality of fastener connections being used to assemble said monitor on both said chassis and said band.

2. The monitor of claim 1, wherein both said first beam and said second beam include a U-shaped cross-section.

3. The monitor of claim 1, wherein said first beam includes both a depression and a rubber washer recessed into said depression for each fastener to connect said lower edge of said band of said cathode ray tube to said first beam.

4. The monitor of claim 1, wherein said first beam and said second beam are joined by two side members, said first beam, said second beam, and said two side members being integrally formed.

5. A monitor, comprising:

a chassis having a front cover and a rear cover and enclosing a cathode ray tube, said rear cover having a bottom side, said cathode ray tube having a substantially rectangular band positioned around a screen, said band having a lower edge, two side edges, and a top edge;

a frame being supported by said bottom side of said rear cover, being engaged to said front cover, and being enclosed in said chassis;

a first beam being attached to said lower edge of said band of said cathode ray tube, said first beam having a first portion simultaneously engaging said edge of said cathode ray tube and said front cover by screws passing through ears of said band of said cathode ray tube and fastener holes of said first beam and fastening said band and said beam on bosses of said front cover and having a second portion engaging said frame; and a second beam being attached to said upper edge of said band of said cathode ray tube, said second beam having a first portion simultaneously engaging said edge of said cathode ray tube and said front cover by screws passing through ears of said band of said cathode ray tube and fastener holes of said second beam and fastening said band and said beam on bosses of said front cover and having a second portion engaging said rear cover.

6. The monitor of claim 5, further comprised of a plurality of fastener connections being used to assemble said monitor onto both said chassis and said band.

7. The monitor of claim 5, wherein said first beam substantially includes a U-shape.

8. The monitor of claim 7, wherein said first beam includes a first side and a second being parallel and connected by a by a bottom plate, said first side having a plurality of flanges being attachable to said frame and said lower edge of said band said cathode ray tube and said second side being connected to said front cover.

9. The monitor of claim 8, wherein said first beam includes both a depression and a rubber washer recessed into said depression for each fastener to connect said edge of said band of said cathode ray tube to said first beam.

10. The monitor of claim 5, wherein said second beam substantially includes a U-shape.

11. The monitor of claim 10, wherein said second beam includes a first side and a second side being parallel and connected by a top plate, said first side having a first plurality of flanges being attachable to said rear cover and to said top edge of said band of said cathode ray tube and said second side having a second plurality of flanges being engageable with said front cover.

12. The monitor of claim 11, wherein said top plate of said second beam is bowed along a center portion to facilitate engaging said front cover.

13. The monitor of claim 11, wherein said second beam includes both a depression and a rubber washer recessed into said depression for each fastener to connect said edge of said band of said cathode ray tube to said second beam.

14. The monitor of claim 5, wherein said frame includes first hole to be connected to said cover and second hole to be connected to said first beam.

15. The monitor of claim 5, wherein said first beam and said second beam are joined by two side members, said first beam, said second beam, and said two side members being integrally formed as a single body.

16. A monitor, comprising:

a chassis having a front cover and a rear cover and enclosing a cathode ray tube, said rear cover having a bottom side, said cathode ray tube having a substantially rectangular band positioned around a screen, said band having a bottom edge, two side edges, and a top edge;

a frame having substantially a rectangular shape, being supported by said bottom side of said rear cover, being engaging said front cover, and being enclosed in said chassis;

a first beam being attached to said lower edge of said band of said cathode ray tube, said first beam engaging said cathode ray tube, said front cover, and said frame;

a second beam being attached to said upper edge of said band of said cathode ray tube, said second beam engaging said cathode ray tube, said front cover, and said rear cover; and said first beam including a first side, a second side, and a bottom plate connecting said first side to said second side, said first side having a plurality of flanges being attachable to said frame and said bottom edge of said cathode ray tube and said second side being connected to said front cover.

17. The monitor of claim 16, wherein said first beam and said second beam are joined by two side members, said first beam, said second beam, and said two side members being integrally formed as a single body.

18. The monitor of claim 16, further comprised of a plurality of fastener connections being used to assemble said monitor onto both said chassis and said band.

19. A monitor, comprising:

a chassis having a front cover and a rear cover and enclosing a cathode ray tube, said rear cover having a bottom side, said cathode ray tube having a substantially rectangular band positioned around a screen, said band having a bottom edge, two side edges, and a top edge;

a frame having substantially a rectangular shape, being supported by said bottom side of said rear cover, being engaging said front cover, and being enclosed in said chassis;

a first beam being attached to said lower edge of said band of said cathode ray tube, said first beam engaging said cathode ray tube, said front cover, and said frame;

a second beam being attached to said upper edge of said band of said cathode ray tube, said second beam engaging said cathode ray tube, said front cover, and said rear cover; and said second beam including a first side, a second side, and a top plate connecting said first side to said second side, said first side having a first plurality of flanges being attachable to said rear cover and to said top edge of said band of said cathode ray tube and said second side having a second plurality of flanges being engageable with said front cover.

20. The monitor of claim 19, wherein said top plate of said second beam is bowed along a center portion to facilitate engaging said front cover.

21. The monitor of claim 19, further comprised of a plurality of fastener connections being used to assemble said monitor onto both said chassis and said band.

* * * * *